May 12, 1970　　　D. C. AVAMPATO　　　3,511,776
METHOD AND APPARATUS FOR REMOVING IONS FROM WATER
Filed Feb. 18, 1966
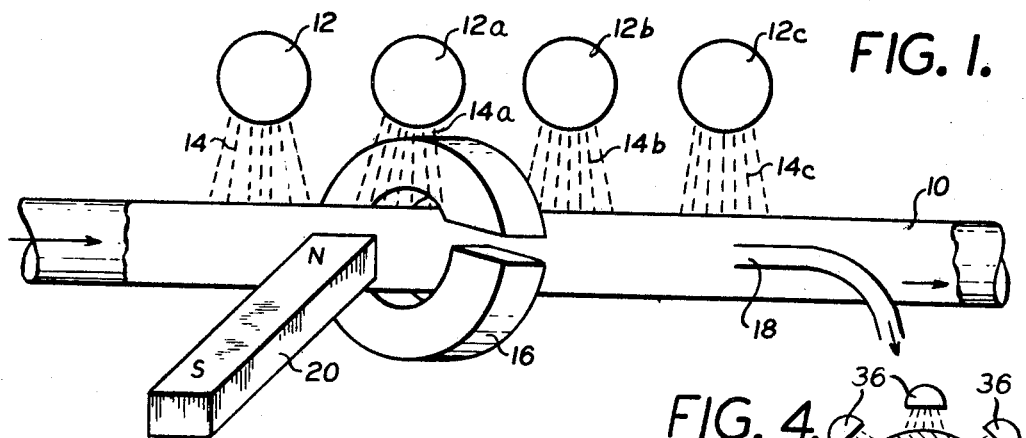
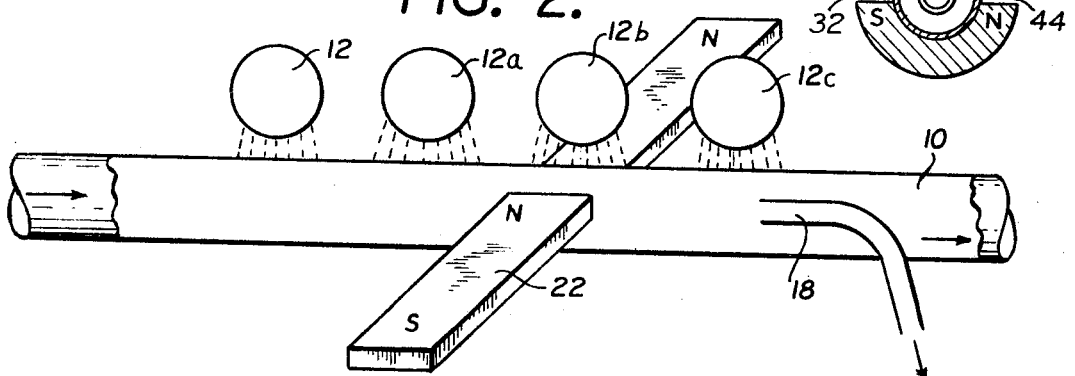
INVENTOR
Dominic C. Avampato
BY
ATTORNEYS.

United States Patent Office 3,511,776
Patented May 12, 1970

3,511,776
METHOD AND APPARATUS FOR REMOVING IONS FROM WATER
Dominic C. Avampato, 223 3rd St., Passaic, N.J. 07055
Continuation-in-part of application Ser. No. 506,977, Nov. 9, 1965. This application Feb. 18, 1966, Ser. No. 528,567
Int. Cl. B03c 1/14, 5/02
U.S. Cl. 210—42                                                   15 Claims

ABSTRACT OF THE DISCLOSURE

Electro-magnetic energy, mostly of a wave length within the spectrum of ultra-violet light and X-rays, is radiated into water to make ions, which are susceptible to those wave lengths, become responsive to the influence of a magnetic field. While the water is subject to the influence of this radiant energy, a magnet is used to separate the ions transversely of the cross section of the body of water, and water of different ion concentration is withdrawn for localized regions of the cross section.

RELATED PATENT APPLICATION

This application is a continuation-in-part of application Ser. No. 506,977 filed Nov. 9, 1965, and now abandoned. This later application includes the use of X-rays and has another species added to the apparatus as shown in FIGS. 5 and 6 hereof.

BACKGROUND AND SUMMARY OF THE INVENTION

This invention relates to a method and apparatus for purifying sea water to make it potable aid to extract ions (of metals, etc.) from the water at low cost.

It is an object of the invention to provide an improved method for removing sodium chloride, and other dissolved substances, from sea water. The degree of removal and the kind of substances removed depends upon the use for which the treated water is intended. For example, in preparing sea water for drinking purposes, it is sufficient to remove the sodium chloride but other salts that make the water "hard" are usually not objectionable in drinking water.

If the water is to be treated for washing purposes, then it is desirable to have "soft" water as the final product, and salts other than sodium chloride are removed.

It is another object of the invention to remove dissolved materials from sea water for the value of the materials, for example magnesium and bromine which are present in sea water in substantial quantities. When using the invention as a recovery process, the extent of treatment depends upon considerations of economy and it may be unnecessary to produce water of high purity since the concentrations become weak as the degree of purity rises. If sodium is not one of the metals to be removed, the treated water may not be suitable for drinking.

It is an outstanding advantage, however, that it can recover materials of value as a by-product to the making of potable water from sea water; but it will be evident that the invention is not limited to separation of products from sea water but can be used with other kinds of water as well.

Another object of the invention is to provide a method and apparatus that can be operated to remove selectively various dissolved materials from sea water. The invention uses electromagnetic radiation, preferably in the ultra-violet spectrum, and/or in the X-ray spectrum, and sometimes beyond these spectrums, to change the charge on ions in the water being treated, and then uses an electromagnetic field to vary the concentrations of the ions at different localized parts of the cross section of the stream. Water for further purification, or end use, is withdrawn as a continuous stream at the region of reduced ion concentration. Water is withdrawn from the region of high ion concentration for recovery of dissolved materials. When necessary, the selected streams of water are subjected to multi-stage treatment.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views;

FIG. 1 is a diagram illustrating the method and apparatus for purifying sea water in accordance with this invention;

FIG. 2 is a diagram similar to FIG. 1 but showing somewhat different apparatus;

FIG. 3 is a diagrammatic sectional view showing apparatus for multi-stage treatment of water when purifying the water in accordance with this invention;

FIG. 4 is a sectional view taken on the line 4—4 of FIG. 3;

FIG. 5 is a diagrammatic view, partly in section, showing a modified form of the invention; and FIG. 6 is a sectional view taken on the line 6—6 of FIG. 5.

DESCRIPTION OF THE PREFERRED EMBODIMENTS

Sea water flowing through a pipe 10 is subjected to radiation of electromagnetic energy from a tube 12. The rays of radiant energy are indicated by the reference character 14, and the wall of the pipe 10 is transparent to these rays 14. The effect of this energy on the salts in the water in the pipe is to make the ions in the salts more susceptible to a magnetic field.

The explanation for this change is that the radiation of the proper wave length strips electrons from the ions and reduces the ions to a higher degree of ionization potential. The intensity of the radiant energy must be controlled so that once the electrons have been removed they are kept off the more positively charged ions.

After radiation by the energy rays 14 and during further radiation by other energy rays 14a from a tube 12a, the water passes through the magnetic field of an electromagnet 16 extending around the circumference of the pipe 10. This magnetic field concentrates the ions in localized areas of the cross section of the water stream. In the apparatus illustrated the concentration of ions is outward from the center of the pipe 10.

As the water flow continues through the pipe 10, the water at the central region at the cross section of the pipe is withdrawn through an outlet pipe 18 and this outlet pipe deflects the water of less ion concentration through a part of the outlet pipe 18 that leads through the side wall of the pipe 10 and to a location outside of the pipe. The water with the greater concentration of ions continues to flow onward through the pipe 10.

There is a bar magnet 20 with one pole located close to a side of the pipe 10 cutting down on Brownian motion of the ions in the water. Other plans for cutting down on Brownian motion may be used, including the reducing of the water to a temperature approaching the freezing temperature.

FIG. 2 shows a modified construction in which a bar magnet 22 is used on one side of the pipe 10 and there is a similar bar magnet on the other side of the pipe 10 with its other pole adjacent at the pipe 10 for producing ion concentrations near the wall of the pipe. These magnets take the place of the circumferentially ex-ling electromagnets of FIG. 1, but the construction is rwise the same as FIG. 1 and similar parts are indi-d by the same reference characters.

IGS. 3 and 4 show apparatus for subjecting the water uccessive ion separation operation so as to obtain er purity of the water. There are two pipes includ-an upper pipe 32 and a lower pipe 34. The water in pipes is subject to radiation from tubes 36 at spaced tions along the length of the pipes. Some of the tubes may radiate energy of different wave length from of other tubes, and some of the tubes may radiate gy of a band of wave lengths depending upon the icular materials in the water of which ions are to be oved. There are preferably sources of radiation, for he ions to be removed, associated with each of the es of the apparatus; that is, for each of the successive s of ion separation.

he flow through the pipes 32 and 34 is towards the in FIG. 3 as indicated by arrows 37. The water is cted to radiation from the tubes 36 to the left of st magnet 42 around the upper pipe 32 and a first net 44 around the lower pipe 34. Each of these mag-is made in two parts with opposite polarity as shown IG. 4 to obtain a strong magnetic field through the r in the pipes.

ater from the center region of the cross section of pipe 32 is withdrawn through an outlet pipe 46 and through this outlet pipe 46 to a center region of lower pipe 34. Water outward from the entrance to utlet pipe 46 continues to flow along the length of the 32. Beyond the magnet 44 of the lower pipe 34, the r adjacent to the side walls of the pipe is deflected affles 48 into a circumferential chamber 50 from h the water flows through a connecting pipe 52 to a mferential chamber 54 around the upper pipe 32; from this chamber 54, the water is deflected by other es 56 to the region of the cross section of the pipe djacent to the wall of the pipe 32.

second separation stage includes a magnet 42a nd the upper pipe 32 and a similar magnet 44a around ower pipe 34; and after the water has passed through magnetic field of these second stage magnets 42a and the water from the center region of the cross section e upper pipe 32 is discharged through an outlet pipe into a corresponding part of the cross section of the r pipe 34; and water around the circumferential por-of the cross section of the lower pipe 34 is directed affles 48a into a circumferential chamber 50a.

om the chamber 50a, the water flows through a con-ing pipe 52a to a circumferential chamber 54a from h it is deflected by other baffles 36a into the region e cross section of the pipe 32 adjacent to the wall at pipe. FIG. 3 shows a third stage of treatment with indicated by the same reference characters as at the r stages, but with a letter "b" appended.

om FIG. 3 it will be apparent that after each op-ion on the water, the purer water is deflected from 32 to pipe 34 and the water with the higher con-ration is deflected from the pipe 34 to the pipe 32. neans of enough successive treating stages, as shown IG. 3, the purity of the water in the pipe 34 can be ght to a desired condition. For example, the sodium ride can be removed so that the water is suitable for king, or other salts can be removed to make the r soft for laundry and other washing uses.

IGS. 5 and 6 show a modified form of the invention hich the water flows through a pipe 60. Tubes 62 for iting energy to the water are actually immersed in water stream and are connected through openings in wall of the pipe 60 with terminals 64 for supplying ricity to the tubes 62. This construction is advanta-s when the radiation is reduced in effectiveness by age through air into contact with the pipe and/or where there is loss of radiant energy by passage through the wall of the pipe.

A horseshoe magnet 68, energized by a coil 69, has pole faces at opposite sides of the pipe 60; and the pipe 60 is made of material that permits the magnetic flux to pass freely into the water in the pipe to attract ions toward the magnet poles and thus concentrate ions toward the sides of the pipe 60.

Toward the ends of the tubes 62 and the magnetic field there are longitudinally-extending partitions 72 which divide the interior of the pipe 60 into a center section 74 and side sections 75. Multistage constructions can be used if desired.

The wave length of the radiant energy can be in the ultraviolet or the X-ray spectrum, or somewhat beyond these spectrums in either direction, and the energy radiated by the tubes may constitute of band embracing a number of wave lengths. Theoretically, there is a preferred wave length for the ions of each substance that is to be removed from the water or that is to be concentrated, but it is practical to apply the radiant energy to a number of substances simultaneously.

Where action on ions of a particular substance is desired the wave length can be computed. For example, if sodium is to be removed from the water, the wave length for the radiant energy to make the sodium ions susceptible to magnetic attraction can be computed by starting with three basic equations as follows:

$$E = \gamma \nu \qquad (1)$$

where:

E is the energy change in work units (joule seconds or coulomb-volts) produced by the radiant energy 14

$h$ is Plancks constant ($6.63 \times 10^{-34}$)

$\gamma$ is the frequency per second of the radiant energy

Also $$\gamma = c/f \qquad (2)$$

where:

$c$ is the speed of light $l$ is the wave length of the radiant energy

And $$E = qV \qquad (3)$$

where:

$q$ is the electronic charge (coulombs)

And $V$ is the voltage

From these equations we get $$l = ch/qV$$

Substitute known values $$\frac{3 \times 10^5 \text{ m./sec.} \times 6.63 \times 10^{-34}}{1.60 \times 10^{-19} \text{ coulombs} \times 473 \text{ electron volts (for Na+)}}$$

$l = 263$ angstroms

Light of this wave length changes the sodium ion as though it were reduced to the second degree ionization potential, though experimentally this degree of ionization for the sodium ion in water solution has never been found. Examples of other ionization potentials are.

| | Electron volts |
|---|---|
| Magnesium$^{++2}$ | 80.1 |
| Chlorine$^+$ | 13.01 |
| Calcium$^{+3}$ | 51.2 |
| Bromine$^+$ | 11.84 |
| Iodine$^+$ | 10.44 |

The preferred embodiments of the invention have been illustrated and described, but changes and modifications can be made and some features can be used in different combinations without departing from the invention as defined in the claims.

What is claimed is:

1. The method of removing ions from an aqueous solution of a salt comprising radiating into the water, energy which is mostly of wave lengths substantially within the spectrum of ultra-violet light and X-rays to affect the charge on ions of material in the water, and while the water is subject to the radiation passing the treated water through a magnetic field to shift the affected ions to localized areas of the cross section of the water stream, and separating the water of higher ion concentration from that of lower ion concentration.

2. The method described in claim 1 characterized by radiating the water with energy of a wave length that reduces the ions to be removed to at least the next higher degree ionization potential than they already have in natural sea water.

3. The method described in claim 1 characterized by using radiant energy of mixed wave lengths but which contains a substantial amount of energy of the wave lengths that affect the ionization of ions of those substances that are to be removed from the water.

4. The method described in claim 1 characterized by passing a stream of water continuously past a station at which the energy is radiated into the water, subjecting the water to the magnetic field adjacent to the region of radiation, and removing water continuously from a cross section of the water stream beyond the region of separation affected by said magnetic field.

5. Apparatus for purifying an aqueous solution of a salt including in combination a container for the water that is to be purified, a source of radiant energy located in position to radiate, into the water, energy of a wave length substantially within the spectrum of ultra-violet and X-rays to make ions of substances dissolved in the water more susceptible to magnetic attraction, the source of radiant energy being in position to transmit the radiant energy to the water through an air free path, a magnet in position to subject the water to a magnetic field while the water is subject to the radiation and thereby concentrate the ions in localized regions across the cross section of the water, and means for then separating the water of high ion concentration from the other water.

6. The apparatus described in claim 5 characterized by the container being a pipe through which a stream of water flows, and the source of radiant energy being located within the pipe.

7. The apparatus described in claim 6 characterized by an outlet passage having its entrance end in position to withdraw selectively, from the pipe, water of different ion concentration from other water that is at a different area of the cross section of the water stream.

8. The apparatus described in claim 7 characterized by means for treating the separated portions of different ion concentration in a second and similar operation to effect still further separation of the water into portions of even greater differences in ion concentration.

9. The apparatus described in claim 7 characterized by a plurality of groups of radiant energy sources, magnets and outlet passages located along two pipes for successive operations in each pipe on a water stream, the outlet passages leading water of one ion concentration region of one of the pipes to a corresponding region of the other of said pipes at each of said groups.

10. The method of removing ions from salt water comprising radiating electro-magnetic waves of ultraviolet wave lengths through the salt water to affect the charge of ions of material in the salt water, and while the water is subject to the radiation passing the treated water through a magnetic field to shift the affected ions to localized areas of the cross section of the salt water stream, and separating the water of higher ion concentration from that of lower ion concentration.

11. Apparatus for purifying salt water including in combination a container for the water that is to be purified, means for emitting sources of radiant energy of ultraviolet wave length and located in a position to radiate, into the water, energy of ultraviolet wave length to make ions of substances dissolved in the water more susceptible to magnetic attraction, a magnet in position relative to the container to subject the water to a magnetic field while the water is subject to the radiation and thereby concentrate the ions in localized regions across the cross section of the container, and means for then separating the water of high ion concentration from other water of lower ion concentration.

12. The apparatus described in claim 11 characterized by the container being a pipe through which a stream of water flows, the pipe being transparent to the radiant energy, and the sources of radiant energy being at spaced locations lengthwise of the pipe.

13. The apparatus described in claim 12 characterized by an outlet passage having its entrance end in position to withdraw selectively, from the pipe, water of different ion concentration from other water that is at a different area of the cross section of the pipe.

14. The apparatus described in claim 13 characterized by means for treating the separated portions of different ion concentration in a second and similar apparatus to effect still further separation of the water into portions of even greater differences in ion concentration.

15. The apparatus described in claim 13 characterized by a plurality of groups of radiant energy sources, magnets and outlet passages located along two pipes for successive operations on a water stream in each pipe, the outlet passages leading water of one ion concentration in a region of one of the pipes to a corresponding region of the other of said pipes of each of said groups.

References Cited

UNITED STATES PATENTS 2,842,490   7/1958   Friel _____ 204—156

OTHER REFERENCES

Desalination Research and The Water Problem, Washington, D.C., National Academy of Sciences—National Research Council, 1962, p. 72.

Ellis, C. B., Fresh Water From the Ocean, N.Y., The Ronald Press Company, 1954, pp. 38–42, 56, and 62–67.

JAMES L. DeCESARE, Primary Examiner

U.S. Cl. X.R.

210—222

UNITED STATES PATENT OFFICE
CERTIFICATE OF CORRECTION

Patent No. 3,511,776                                                       May 12, 1970

Dominic C. Avampato

It is certified that error appears in the above identified patent and that said Letters Patent are hereby corrected as shown below:

In the heading to the printed specification, lines 4 and 5, "223 3rd St., Passaic, N. J. 07055" should read -- 285 Meadowview Dr., Torrington, Conn. 06790 --. Column 1, line 36, "aid" should read -- and --. Column 3, line 53, "36a" should read -- 56a --. Column 4, line 30, "E-$\gamma\nu$" should read -- E=h$\gamma$ --; lines 32 and 33, "(joule seconds or coulomb-volts)" should read -- (joules) --; line 37, "$\gamma$=C/f" should read -- $\gamma$=C/1 --.

Signed and sealed this 5th day of January 1971.

(SEAL)
Attest:

Edward M. Fletcher, Jr.                                        WILLIAM E. SCHUYLER, JR.
Attesting Officer                                                         Commissioner of Patents